US 6,591,060 B1

United States Patent
Buckley et al.

(12) United States Patent
(10) Patent No.: US 6,591,060 B1
(45) Date of Patent: Jul. 8, 2003

(54) METHODS AND SYSTEMS FOR ENCODING COMMAND SIGNALS IN A VIDEO SIGNAL WITH A VIDEO RECORDER

(75) Inventors: Robert R. Buckley, Rochester, NY (US); Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/219,814

(22) Filed: Dec. 23, 1998

(51) Int. Cl.[7] .............................. H04N 7/00; H04N 5/91
(52) U.S. Cl. ................................. 386/95; 386/46
(58) Field of Search ........................ 386/1, 46, 83, 386/95; 348/212–213, 143, 151, 154–155; 358/906

(56) References Cited

U.S. PATENT DOCUMENTS

| | | | | |
|---|---|---|---|---|
| 4,694,490 A | * | 9/1987 | Harvey et al. ................ 380/20 |
| 4,846,693 A | * | 7/1989 | Baer ........................... 434/308 |
| 5,032,907 A | * | 7/1991 | Isnardi ........................ 348/434 |
| 5,486,853 A | * | 1/1996 | Baxter et al. ................ 348/222 |
| 5,761,601 A | * | 6/1998 | Nemirofsky et al. ......... 455/3.1 |
| 5,847,836 A | * | 12/1998 | Suzuki ....................... 358/296 |
| 6,118,473 A | * | 9/2000 | Tsunezune et al. ........... 348/17 |
| 6,195,530 B1 | * | 2/2001 | Smith et al. ................ 455/5.1 |
| 6,240,242 B1 | * | 5/2001 | Takeuchi .................... 386/121 |
| 6,281,939 B1 | * | 8/2001 | Del Castillo et al. ....... 348/558 |
| 6,298,194 B1 | * | 10/2001 | Takahashi ................... 386/46 |
| 6,304,236 B1 | * | 10/2001 | Arai et al. .................. 345/10 |

OTHER PUBLICATIONS

Smith et al., Digital Data Over Video Channels: Techiques for Spacelab, Apr. 1993, pp. 16–24, IEEE AES Systems Magazine.*

"Casio Introduces 'Personal Video Printer' at CES," *International Online Magazine*, Issue No. 2.22, Skynet Publications, Jul. 21, 1994.

* cited by examiner

*Primary Examiner*—Thai Tran
*Assistant Examiner*—Polin Chieu
(74) *Attorney, Agent, or Firm*—Oliff & Berridge, PLC

(57) ABSTRACT

The command embedding systems and methods enable embedding control signals into standard video signals during recording. Specifically, a user selects a mode of operation of the command signal embedding system. Based on the selected mode, control signals are either manually or automatically embedded in a video signal as the video signal is recorded. The control signals may include, but are not limited to, commands that identify the state of the video camera or the environmental conditions surrounding the video camera or commands that tag key frames in the video signal. Once the control signal is received and embedded, the embedded control signal may be recorded, for example, to facilitate further editing, or may be directly televised or broadcast with further manipulation in mind.

29 Claims, 4 Drawing Sheets

METHODS AND SYSTEMS FOR ENCODING COMMAND SIGNALS IN A VIDEO SIGNAL WITH A VIDEO RECORDER

BACKGROUND OF THE INVENTION

1. Field of Invention

This invention relates to embedding command signals in a video signal. Specifically, this invention is directed towards systems and methods for embedding command signals in a video signal to indicate that at least one next frame is selected for further manipulation.

2. Description of Related Art

Television has become the largest conveyor of information in society today. Programming ranges from general entertainment features to educational programs, such as cooking or home improvement programming, to highly technical seminars or repair and installation manuals. Furthermore, programming in the educational fields is becoming far more popular, with many universities hosting campuses around the world which are interconnected via satellite links. Additionally, a growing number of individuals and companies alike are creating their own video or multimedia presentations.

Even though a tremendous amount of information can be presented to the average person through video data signals displayed on a television or monitor, viewers miss a considerable amount of information simply because the information was not displayed long enough for the viewer to copy it or write it down. Alternatively, if the viewer is not anticipating a change in the video, this could also lead to missed information. For example, nearly everyone has encountered the situation where further information or a product was desired in response to a commercial or a specific piece of programming. Information was flashed on the screen at the end of the program or commercial for a second or two. However, the viewer is often unable to capture enough of the contact information or the telephone number to enable the viewer to follow up.

New methods are being explored to distill the essential content of a video in order to further compress the amount of physical information required to enable a user to grasp the gist of the program. For example, current techniques to segment a video signal into its respective important frames involve a viewer watching the entirety of the video with a finger on an image capture button just in case a suitable, representative image for capture should be displayed.

SUMMARY OF THE INVENTION

Video editing devices, as well as video printers, capture images, i.e., at least one frame, from a video signal and perform some predetermined function on the one or more identified frames. It should be understood that, for the following discussion of the systems and methods according to this invention, the term "video signal" encompasses a signal or group of signals including one or more, or all of, a sequence of video frames, any analog and/or digital audio data, any data that may reside in one or more side bands, and any ancillary analog and/or digital data, such as closed-captioning, that are transmitted or stored together. These signals further include any other known video type or signal or any other signal that would be obvious to incorporate into the "video signal." Furthermore, it should be appreciated that the video signals may be broadcast, for example, by traditional broadcast techniques, or by cable television distribution services, analog and/or digital satellite systems, the Internet, an intranet, such as a local-area network or wide-area network, or any other wired or wireless network. Additionally, it should be appreciated that the video signal can be stored on traditional media, such as videocassettes, or on digital video disks, mini-disks, CD-ROM's, or using volatile or non-volatile memory. Furthermore, it should be appreciated that the video frames of the video signal can be recorded by a video recorder, such as a camcorder, or displayed by a display device, such as a television, monitor, personal computer, overhead projector, or the like.

The systems and methods of this invention use a video recorder, such as a camcorder, television camera, high definition television camera, personal computer video recorder, or teleconferencing video recorder, supplied with a user input device, such as a button or trigger, or a more advanced graphical user interface. When a video image is recorded that the user wants to identify for subsequent manipulation, e.g., printer capture, video editing, or key frame identification, the user 'presses a button' causing the video recorder to identify at least one frame with a command signal appropriate for facilitating subsequent manipulation.

This invention provides systems and methods that manually embed one or more command signals in a video signal to identify at least one subsequent frame for manipulation.

This invention separately provides systems and methods that automatically embed at least one command signal to indicate that at least one subsequent frame is to be manipulated.

This invention separately provides a video recorder with a system or circuit that generates and records in the video signal a command signal identifying at least one frame.

This invention separately provides systems and methods that embed signals within the existing audio and/or video band of a video signal allowing the systems and methods to operate without modification to other system elements. Therefore, the systems and methods operate with existing broadcasts, recorded video systems, playback systems or editing systems.

This invention additionally provides systems and methods that automatically embed environmental information about the video recorder state into the video signal.

For example, in the various systems and methods according to this invention, a user is producing a video with the intention of video printing, video segmenting, or video editing in mind. By inserting commands into the video signal, implementing one of the above-indicated, or any other known or later developed post-recording actions is simplified. For example, a video signal could be embedded containing a capture/print command that could instruct a video printer to capture and print one or more frames of the video signal without requiring a user's interaction. Therefore, a video printer, when placed in an appropriate mode, could automatically print information, or one or more frames of the video signal, identified by the print command inserted into the video signal by the video recorder. In an alternative mode, the systems and methods of this invention could automatically embed a signal indicating the environmental or operational state of the video recorder, e.g., pan, zoom, lighting conditions, or the like. Thus, subsequent editing is simplified since the video signal identifies any change in the camera state. By providing commands in the video signal, the user is provided with information pertaining to frames subsequent to the command.

The systems and methods of this invention may also be used equally well to add command data as described in U.S.

patent application Ser. No. 09/167,553, herein incorporated by reference in its entirety.

These and other features and advantages of this invention are described in or are apparent from the following detailed description of the preferred embodiments.

BRIEF DESCRIPTION OF THE DRAWINGS

Various embodiments of this invention will be described in detail, with reference to the following figures, wherein.

DETAILED DESCRIPTION OF PREFERRED EMBODIMENTS

Figure 1:
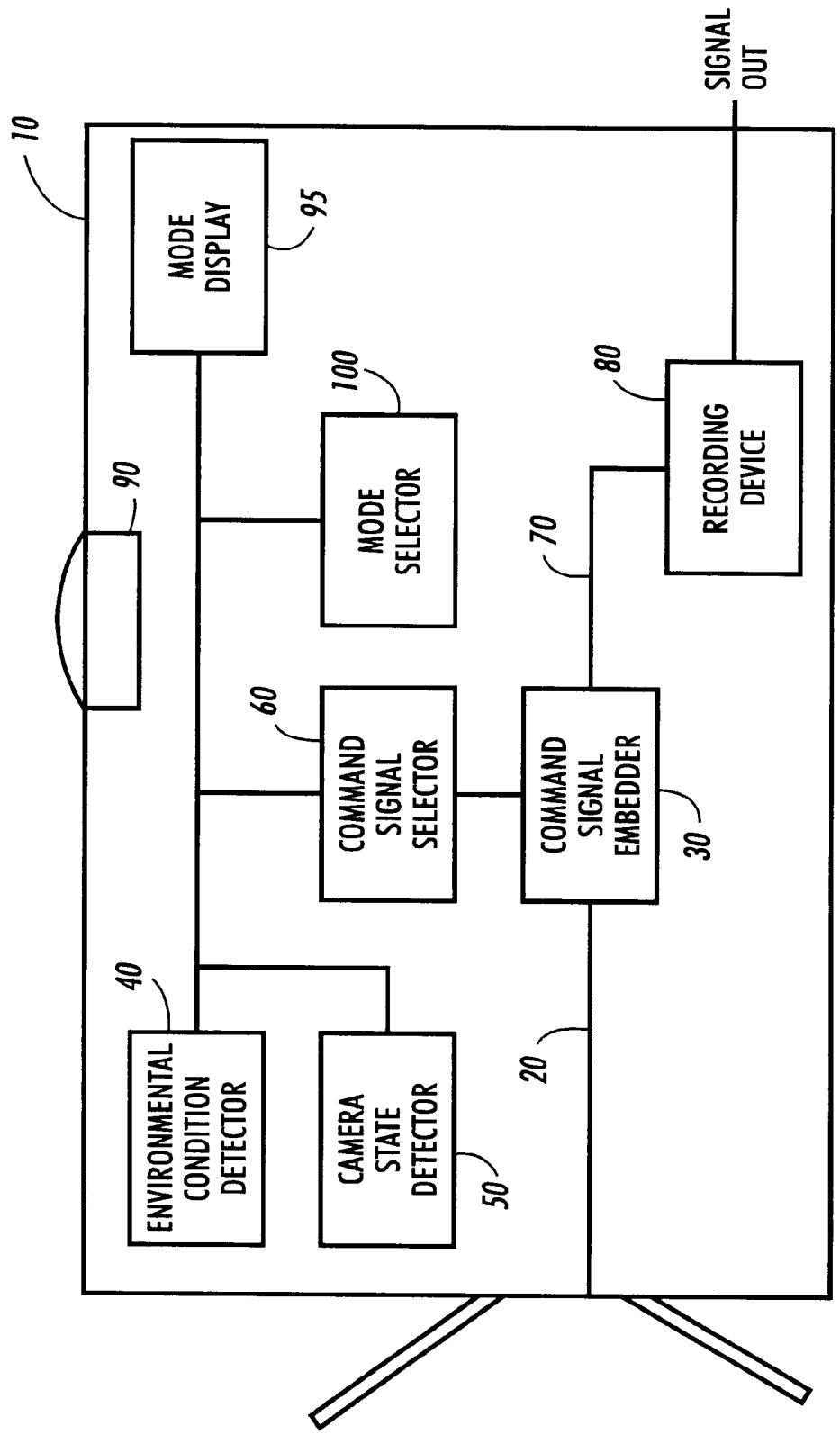
FIG. 1 is a functional block diagram of one exemplary embodiment of the systems for embedding commands into a video signal according to this invention.

FIG. 1 shows a video camera with a command embedding system 10 according to this invention. Specifically, the command embedding system 10 inputs an incoming video signal 20, received from a video camera, and includes a command signal embedder 30, an environmental condition detector 40, a camera state detector 50, a command signal selector 60, a user input device 90, a mode selector 100 and a current mode display 95. The command embedding signal outputs an embedded video signal 70 to a recording device 80. The incoming video signal 20 provides a video signal to the command signal embedder 30 and can be input from a video camera, a camcorder, a personal computer video camera, a teleconference camera, or any other known or later developed signal source that is capable of providing the video signal 20 to the command signal embedder 30.

The command signal embedder 30 receives the input video signal 20 and embeds a control signal in the video signal 20. The control signal indicates that a command is to be performed at some time during playing back of the video signal 20. For example, the command can initiate capture and subsequent printing of a specific frame. More complex commands could cause a series of frames to be captured for printing. Alternatively, for example, the control signal could be used to automatically trigger video editing equipment to, for example, brighten at least one subsequent frame.

In addition to receiving the input video signal, the command signal embedder 30 can also receive a command signal from the command signal selector 60. The command signal selector 60 identifies a command based on a signal received from at least one of the environmental condition detector 40, the camera state detector 50, the user input device 90 and/or the mode selector 100.

A user, using the user input device 90, selects a particular mode of operation. The mode of operation which is displayed on the current mode display 95, however, is not limited to direct embedding of a command signal, but also includes embedding of a command signal based on a change in camera state, embedding of a command signal based on detected environmental conditions, or any other command that may facilitate further manipulation of the video. Based on this selected mode of operation, the command signal selector 60 determines the particular command for forwarding to the command signal embedder 30.

The command signal embedder 30 outputs the embedded video signal 70. This embedded video signal 70 can then be transferred to the recording device 80, such as a video cassette recorder, a digital video disk recorder, a mini-disk recorder, a CD-ROM recorder, volatile or non-volatile memory, or directly to a display device, such as a television, a monitor, a personal computer, an overhead projector, a transmission or broadcast system, or the like.

The mode selector 100, in conjunction with an input received from the user input device 90, determines both the type of control signal to be embedded, as well as the location of the control signal. For example, a first mode would automatically insert a command to indicate change in camera state, e.g., a change in zoom or pan. A second mode would insert a control signal representing environmental conditions surrounding the video camera. For example, the environmental condition detector 40 could detect audio volume levels or ambient light conditions. A third mode would place the system in a "manual" state that would allow the user to select, via the user input device 90, the control signal to be embedded as well as the location, i.e., frame or frames, where the control signal is to be embedded.

Alternatively, a fourth mode could allow either the environmental condition detection 40, or camera state detector 50, to determine when a control signal is embedded. For example, the camera state detector could perform a histogram analysis of the incoming video signal. If the histogram change exceeds a threshold, for example, when a scene changes without a change in zoom or pan, or for example, when a person walks into the scene, a control signal could be embedded. This could prove particularly useful in a security camera type environment. For example, the video recorder could record in a closed loop until, for example, a histogram change threshold is exceeded. At this point, the video recorder could switch to an open loop recording state and insert control signals each time the scene changed, e.g., each time a burglar enters or leaves the camera's field of view. It should be appreciated, however, that the modes are not limited to those described above. Thus, any number of different modes can be implemented depending on the particular needs of the user.

Figure 2:
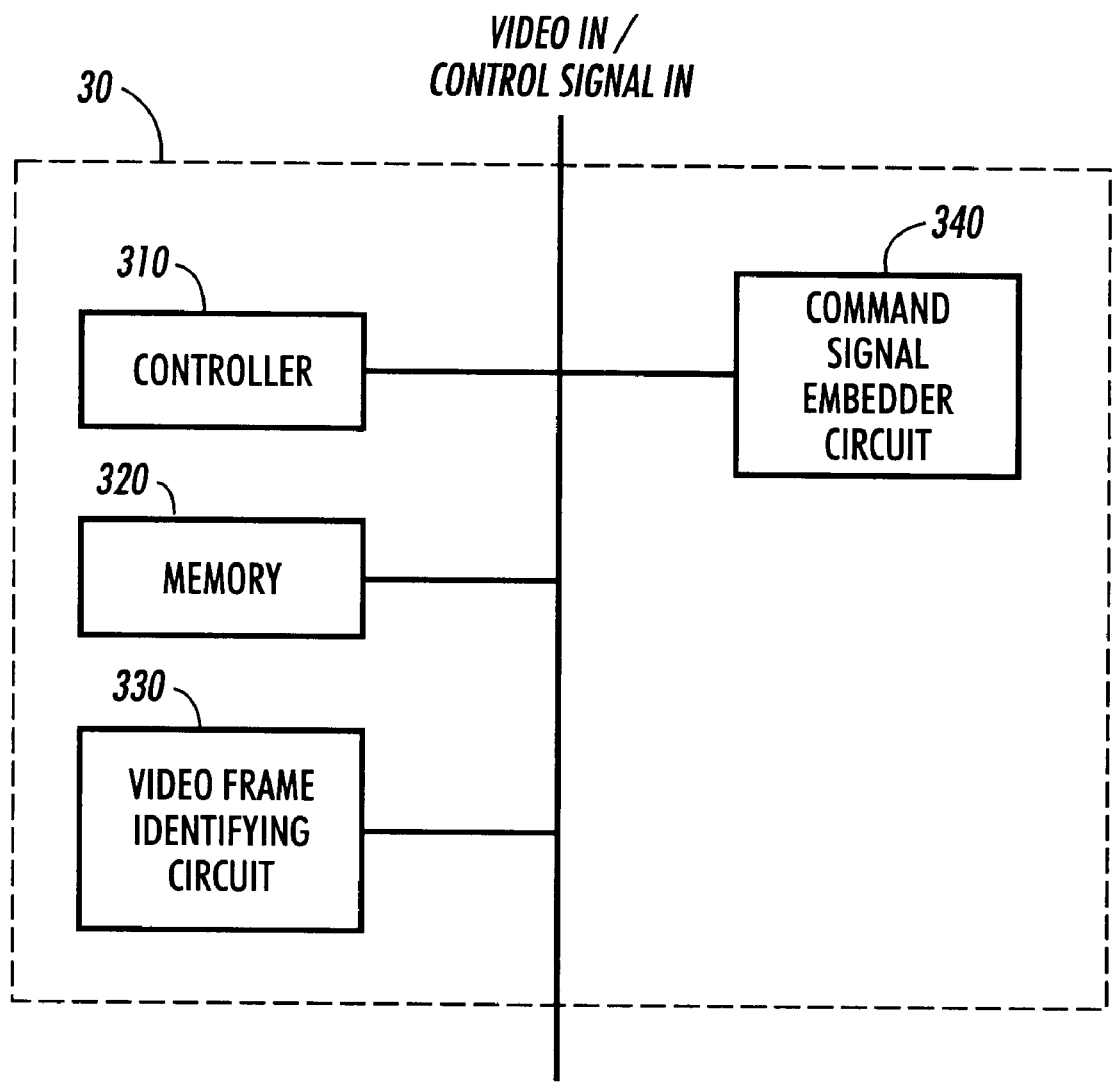
FIG. 2 is a functional block diagram showing in greater detail one exemplary embodiment of the command signal embedder of FIG. 1.

FIG. 2 shows in greater detail one exemplary embodiment of the control signal embedder 30 of FIG. 1. Specifically, in the exemplary embodiment showed in FIG. 2, the control signal embedder 30 comprises a controller 310, a memory 320, a video frame identifying circuit 330 and a control signal embedding circuit 340.

The video frame identifying circuit 330 receives, at the direction of the controller 310, the incoming video signal 20 and at least one control signal. The control signal embedding circuit 340, in cooperation with the memory 320 and the video frame identifying circuit 330, embeds at least one control signal in at least one frame of the incoming video signal 20. For example, upon receipt of a control signal, the video frame identifying circuit 330 identifies at least the next frame in the video sequence. The command signal embedder circuit 340 then embeds the control signal in the at least one identified frame. However, as previously mentioned, the control signal can be embedded anywhere in the incoming video signal.

It should be understood that each of the circuits shown in FIGS. 1 and 2 can be implemented as portions of a suitably programmed microprocessor system, microcontroller system or general purpose computer. Alternatively, each of the circuits shown in FIGS. 1 and 2 can be implemented as physically distinct hardware circuits within an ASIC, or using an FPGA, a PDL, a PLA or a PAL, or using discrete logic elements or discrete circuit elements. The particular form each of the circuits shown in FIGS. 1 and 2 will take is a design choice and will be obvious and predictable to those skilled in the art.

Figure 3:
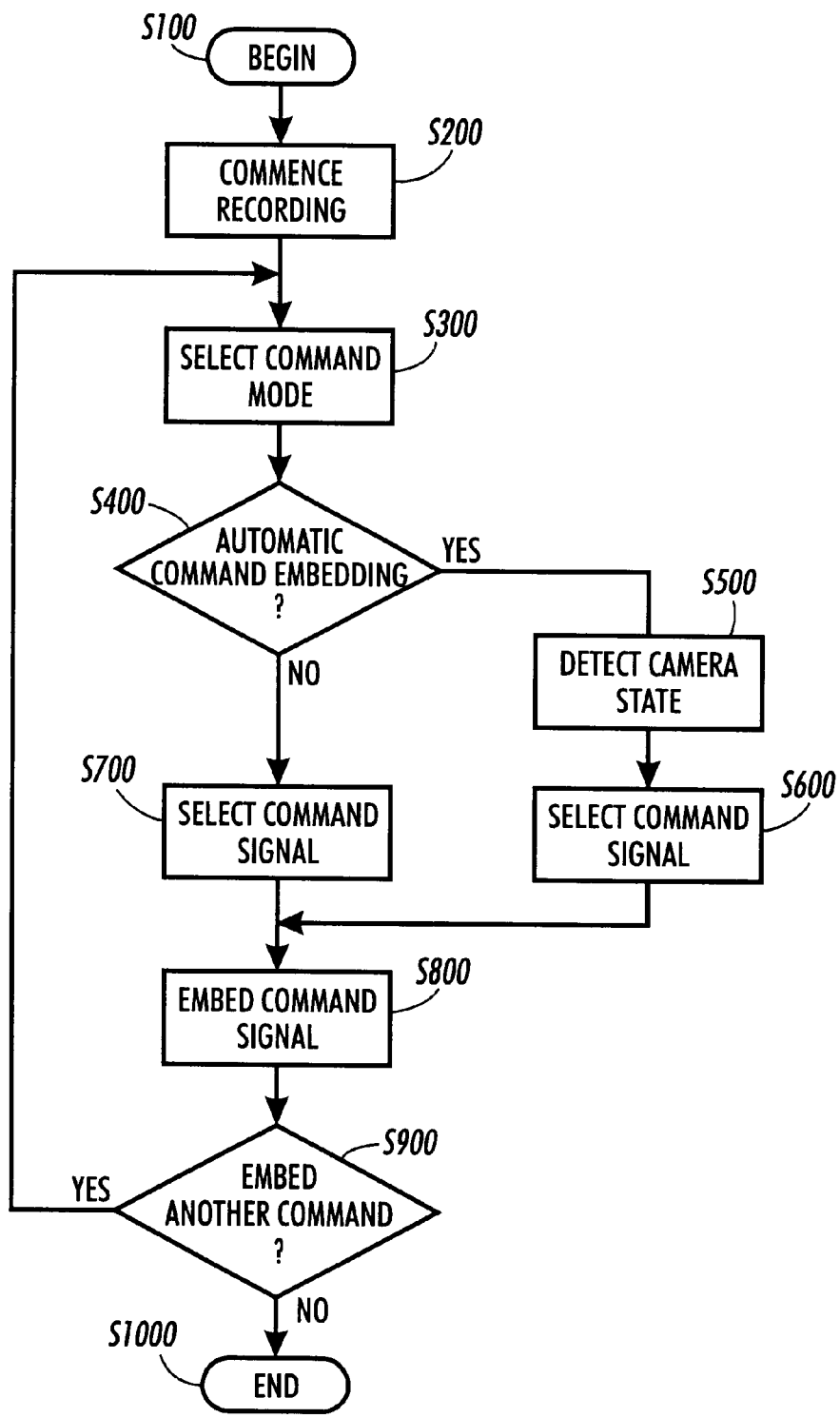
FIG. 3 is a flowchart outlining one exemplary embodiment of the methods for embedding commands into a video signal according to this invention.

FIG. 3 is a flowchart outlining one exemplary embodiment of the methods for embedding command signals in a video signal. Once a determination is made that a video signal is to include one or more control signals, control begins in step S100. Control then continues to step S200, where recording the video signal is begun. Next, in step S300, a command mode is selected. Then, in step S400, a determination is made whether automatic command embedding should be used. If automatic command embedding is desired, control continues to step S500. Otherwise, if manual command embedding by the user is to be used, control jumps to step S700.

In step S500, the camera state and/or the environment condition surrounding the camera are detected. Next, in step S600, a command signal is selected based on the detected camera or environmental state. Control then jumps to step S800.

In step S700, a command signal is selected by the user. Control then continues to step S800.

In step S800, the command signal is embedded in the video signal. Next, in step S900, a determination is made whether any further commands are to be embedded. If more commands are to be embedded, control jumps back to step S300. Otherwise, control continues to step S1000, where the control sequence ends.

Figure 4:
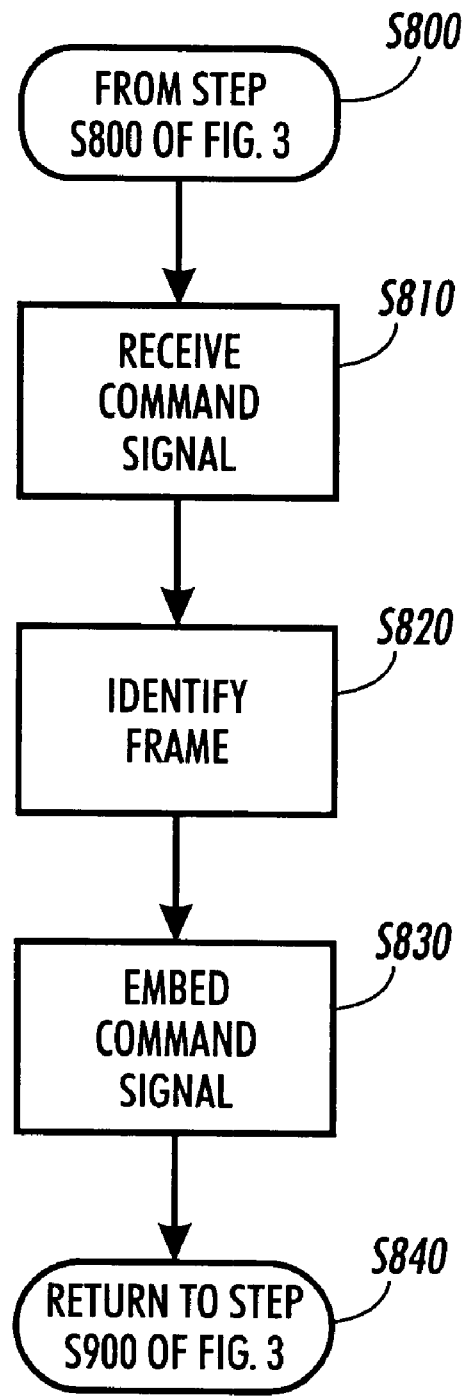
FIG. 4 is a flowchart outlining in greater detail one exemplary embodiment of the method for automatically embedding commands in the video signal according to this invention.

FIG. 4 is a flowchart outlining in greater detail the command embedding step S800 of FIG. 3. Control begins in step S800, and continues to step S810, where a command signal is received either based on user input, or based on detected camera state or environment condition. Next, in step S820, the frame to be embedded is identified. Then, in step S830, the command signal is embedded in the identified frame. Control then continues to step S840, where control returns to step S900 of FIG. 3.

Once the command embedding system has identified a frame to be embedded, the command embedding system should be capable of embedding commands in multiple frames in quick succession.

It should be appreciated that, while the systems and methods of this invention have been described in relation to a digital environment, the systems and methods for encoding command signals in a video signal with a video recorder could also be implemented in an analog environment. Accordingly, one of ordinary skill in the art could easily modify the above disclosed exemplary embodiments of the command embedding systems and methods of this invention to operate in an analog environment.

Furthermore, the command embedding system need not capture every frame of the incoming video signal 20. It should be appreciated that the systems and methods of this invention work equally well for embedding commands "on the fly."

In addition to the control or "command" signal being embedded, the control signal can optionally be embedded with audible or visible features representing the embedded command. However, it should be appreciated that the control signal does not have to specifically embed camera state or environmental information, but is more generically defined as a control signal which is embedded in a video signal for controlling an external or subsequent function.

As shown in FIG. 1, the command embedding system 10 is preferably implemented using a programmed microprocessor or microcontroller and peripheral integrated circuit elements. However, the system for embedding control signals can also be implemented using a programmed general purpose computer, a special purpose computer, an ASIC or other integrated circuit, a digital signal processor, a hard-wired electronic or logic circuit such as a discrete element circuit, a programmable logic device such as PLD, PLA, FPGA, or PAL, or the like. In general, any device which is capable of implementing a finite state machine that is in turn capable of implementing the flowcharts shown in FIGS. 3 and 4 can be used to implement the command embedding system 10 system.

It should be appreciated, however, that the control signal is not limited to embedding in a single frame. For example, the user may wish to embed a control signal in a number of frames, for example, to instruct a printer to capture 2 or more frames and to assemble the captured frames into a single image to achieve a higher resolution or greater spatial area (tiling). The user may also wish to indicate the following number of frames when recorded during a zoom function. It should be appreciated that this disclosure has not listed all the possibilities or variations for the control signal that can be used with the command embedding systems and methods of this invention, or that will be obvious to one of ordinary skill in the art. Thus, one of ordinary skill in the art can easily modify the disclosed exemplary embodiments of the command embedding systems and methods of this invention to use the embedded control signals for any known or later developed purposes without any undue experimentation or any unpredictability in the results of such modifications. Thus, while the scope of this disclosure is specifically intended to encompass all such modifications, it is not necessary to describe to one of ordinary skill in the art each such modification. Thus, the disclosed exemplary embodiments of the command embedding systems and methods of this invention describe a mechanism for communicating with and controlling various types of equipment by a control signal embedded in the embedded video signal at the time of recording.

For example, one embedded command may be a label that denotes a certain category of information. For example, all holiday videos may have the same tag. This tag could be different from a tag attached to recordings made for insurance purposes. Furthermore, the tag may indicate that additional information exists in one of the closed-caption tracks. The tag may also provide a level of importance, e.g., identifying a significant or key frame, that could be used to further edit the video. In this way, a user would not have to view the entire recorded video, but need only review those frames embedded with a command signal indicating they are of particular relevance.

Several methods of embedding control signals and a video signal are possible. For example, the control signals can be embedded as audio tones similar to those used by touch-tone phones. Furthermore, the control signals could be placed in the vertical blanking portion of the video, similar to known closed-captioning information techniques. Specifically, the control signals could make use of the actual closed-captioning signal by means of a special character or character sequence. Alternatively, the control signals can be placed in a secondary audio program (SAP). Similarly, any other known or later developed scheme could be used to embed the control systems in the video signal.

Furthermore, one of ordinary skill in the art could easily modify the above-disclosed exemplary embodiments of the command embedding systems and methods of this invention to provide control signals to control devices and/or peripheral items or settings in addition to the features specifically discussed herein. Specifically, the above-disclosed control signals can be used to adjust the color, the brightness, the hue or saturation, to control volume, or to configure tone controls, to monitor a simulcast, to set an image tiling direction, to control a computer, for example, to retrieve and display a web page, to control a VCR, or to signal an alarm or special message or the like in any subsequent system displaying the embedded video signal.

Additionally, it should be understood that recording the embedded signal prior to subsequent replay is not essential. Specifically, with the video camera that is capable of outputting directly to a system for displaying the video signal, the embedded video signal can be directly output or broadcast or televised as desired. Therefore, the embedded video signal can be directly output to any source.

While this invention has been described in conjunction with the specific embodiments outlined above, it is evident that many alternatives, modifications and variations will be apparent to those skilled in the art. Accordingly, the preferred embodiments of this invention, as set forth above, are intended to be illustrative, and not limiting. Various changes may be made without departing from the spirit and scope of the invention.

What is claimed is:

1. A method of embedding at least one control signal in a video signal with a video recording comprising:
    inputting a video signal;
    embedding a control signal for print command in the video signal based on an operational mode of a video recording device, the video recording device automatically records the video signal embedded with the control signal to identify at least one frame of the video signal;
    automatically selecting a command to be embedded in the video signal based on the operational mode; and
    outputting the embedded video signal.

2. The method of claim 1, wherein the control signal controls at least one of a video frame identifying device, a video editing device, a video printer device, a computer, a peripheral device, a television, a stereo, an audio signal processor, or a video signal processor.

3. The method of claim 1, wherein the control signal identifies at least one frame of the video signal to be further manipulated.

4. The method of claim 3, wherein the control signal is embedded into the video signal at a position corresponding to the at least one frame to be further manipulated based on that control signal.

5. The method of claim 1, wherein the control signal controls at least one of color, brightness, hue, saturation, volume, tone, manipulation of a simulcast, an image tiling direction, a VCR, a signal, an alarm, a special message, or a function of a peripheral device.

6. The method of claim 1, wherein the control signal controls a peripheral device.

7. The method of claim 6, wherein the peripheral device is at least one of a computer, a printer, a display device, an audio reproduction device or a video editing or reproduction device.

8. The method of claim 1, wherein the automatic mode of operation embeds control signals based on at least one of camera state or environmental conditions.

9. A system for identifying at least one frame of a video signal to be embedded with a control signal comprising:
    a controller;
        a command signal selector for print command that selects a command to be embedded in a video signal based on a mode of operation;
        a video frame identifying device capable of identifying at least one video frame to be automatically embedded with a command signal; and
        a command signal embedder that embeds the command selected by the command signal selector into the at least one identified video frame.

10. The system of claim 9, wherein the command signal selector receives at least one signal indicative of the state of a video recording device or a users input.

11. The system of claim 10, further comprising an environmental condition detector that outputs and forwards to the command signal selector a signal representing at least one environmental state of the video recording device.

12. The system of claim 11, wherein the environmental state is at least one of volume or lighting conditions.

13. The system of claim 10, further comprising a camera state detector that detects and outputs to the command signal selector a signal representing at least one camera state of the video recording device.

14. The system of claim 13, wherein the camera state is at least one of pan, zoom or fade.

15. The system of claim 9, further comprising an operational mode selector that determines at least one of at least one operational mode.

16. The system of claim 15, wherein, in the one operational mode, the system embeds a control signal based on a detected environmental condition.

17. The system of claim 15, wherein, in one operational mode, the system embeds a control signal based on a detected camera state.

18. The system of claim 15, wherein, in one operational mode, the system embeds a control signal based on a user input.

19. The system of claim 18, wherein, in one operational mode, the system embeds a control signal based on a detected camera state.

20. The system of claim 19, wherein, in the one operational mode, the system embeds a control signal based on a detected environmental condition.

21. The system of claim 18, wherein, in the one operational mode, the system embeds a control signal based on a detected environmental condition.

22. The system of claim 9, further comprising a video recorder.

23. The system of claim 22, wherein the video recorder is one of a camcorder, a personal computer video camera, a teleconference camera or a video editor.

24. A system for embedding a control signal in a video signal comprising:
    a video signal source;
    a control signal source;
    a video signal embedder that, upon receiving a video signal from the video signal source and the control signal source, automatically embeds the control signal for print command in the video signal which identifies at least one frame of the video signal; and
    a video output device that outputs the embedded video signal;
    wherein the control signal is capable of controlling at least one of a video editing device, a video recording device, a video printing device or a video processing device.

25. The system of claim 24, wherein the output device is a video recording device that stores the embedded video signal.

26. The system of claim 25, wherein the video recording device stores the embedded video signal on one of a video cassette, a digital video disk or a laser disk.

27. The system of claim 25, wherein the video recording device stores the embedded video signal on at least one of a magnetic, optical or magneto-optic medium.

28. The system of claim 24, wherein the video output device is a broadcast system that transmits the embedded video signal.

29. The system of claim 28, wherein the broadcast system is at least one of cable network, a satellite television network, an antenna, a closed circuit television system, an intranet, the Internet, or a wired or wireless network.

* * * * *